Patented Mar. 14, 1939

2,150,641

UNITED STATES PATENT OFFICE

2,150,641

PROCESSING OF HYDROCARBON TAR-LIKE PRODUCTS

Charles A. Thomas and Fred Lowell Taylor, Dayton, Ohio, assignors to Monsanto Chemical Company, St. Louis, Mo., a corporation of Delaware No Drawing. Application November 19, 1936, Serial No. 111,620

4 Claims. (Cl. 260—82)

This invention relates to a new synthetic resin and to a process for its preparation. More particularly it contemplates the manufacture of a resinous product and recovery of naphthalene and its derivatives in substantially pure state from tars formed in the cracking of petroleum distillate fractions.

One object of the invention is to provide a process for the preparation of resins from tars resulting from the cracking of hydrocarbons.

Another object of the invention is to provide a method of processing petroleum tars formed by pyrolysis of hydrocarbons whereby valuable naphthalene compounds are obtained in a form which makes their isolation in a pure state both convenient and economical.

Other objects and advantages of the invention will be apparent from the following description.

The present invention provides a process of recovering naphthalene and other high-boiling aromatic hydrocarbons in a relatively pure state from the tars resulting in the high-temperature pyrolyses of petroleum and other hydrocarbons. By high-temperature pyrolysis is meant pyrolysis at temperatures which are at least high enough to produce aromatic compounds. Such temperatures are ordinarily in the range of 600° to 1000° C. These tars comprise the pyrolysis products having boiling points in excess of about 180° to 200° C.

According to the invention, the tar resulting in such pyrolysis processes is separated by distillation into about 80% of a substantially liquid distillate and 20% of a residue of harder tar; if sub-atmosphere pressures of about 1 to 10 mm. of mercury are used and the distillation is carried to about 300° C. In the next step the liquid distillate is treated by agitation at room temperature or somewhat higher with about 1.5% by weight of anhydrous aluminum chloride or other suitable metallic halide Friedel-Crafts catalyst. The treatment is conducted for a period which under the particular conditions is found by experiment to yield satisfactory products, usually about 3 hours, following which the metallic halide catalyst is removed, preferably without liberating free hydrogen chloride, by precipitation with an alkali, such as an alcoholic solution of ammonia, sodium hydroxide or other water-soluble alkali, and the precipitated solids are removed by filtration. The filtrate is then distilled whereupon it is found that naphthalene passes over in a relatively pure form and, as distillation progresses, other fractions consisting of methylnaphthalenes, dimethylnaphthalenes and higher homologues pass over. The residue from this step consists of a hard resin of high iodine number and having good varnish forming properties where color is not important.

The naphthalene which distills over in the process of the invention is white in color and crystalline, whereas that obtained by simple distillation of the liquid distillate is variable in color and fails to crystallize. The naphthalene obtained by simple distillation of a cracked petroleum distillate can be made to solidify in the form of a smear, but not in well-formed crystals. Thus, the process provides a simple method of recovering high-boiling aromatic hydrocarbons.

The naphthalene, naphthalene homologues, and higher-boiling products recovered in the process are important chemical intermediates for the manufacture of dyestuffs, pharmaceuticals, phthalic anhydride, maleic anhydride and on hydrogenation yield useful solvents and plasticizers.

The resin recovered in the present process is of intense black color, is aromatic in nature, soluble in benzene and has a melting point which may vary from 20° C. to as high as 165° C. It is usable for the manufacture of jet black varnishes and for other purposes for which high-grade tars and pitches are adapted. The tars are excellent materials for the manufacture of lampblack, for which purposes they can be blended with other hydrocarbon liquid feed stocks.

When the resin is treated with steam, it is somewhat lightened in color and can be used in lighter-colored varnishes. This treatment with steam also serves to increase the melting point of the resin. Similar products are obtained by treatment of the resin with carrier gases such as nitrogen and carbon dioxide.

The process can be modified in that the preliminary distillation can be omitted, that is, the liquid tar collected in the cracking operation can be treated directly with the Friedel-Crafts catalyst without prior distillation, and subsequently recovered in the usual manner according to the described procedures.

A typical example of a method of obtaining the beneficial results of the invention follows.

The high ends of a pyrolysis, having an initial boiling point of 180° C. and a specific gravity of 1.0 at 20° C., which resulted from a high-temperature pyrolysis of kerosene at a temperature of 1400° F., were distilled under a pressure of about 4 mm. until the boiling point of the distillate was 300° C. The residue, which was a black tar that solidified on cooling, consisted of 20% of the original stock, whereas the distillate was a light-colored liquid containing more or less crystalline material in suspension. (This step is represented diagrammatically hereinbelow as Step 1.)

To the distillate was then added 1.5% by weight of anhydrous aluminum chloride and the mixture was agitated for about three hours. There was little rise in temperature as a result of reaction. After this treatment the aluminum chloride was removed by adding a stoichiometrical proportion of alcoholic sodium hydroxide and the products of the double decomposition of the aluminum chloride, which were insoluble in the residual liquid, were removed by filtration under pressure. The filtrate was distilled under vacuum, as previously described. The distillate consisted of a liquid which deposited crystals and the residue was a hard black resin, soluble in benzene. The yields, based on the original tar are indicated on the diagram (Step 2). The distillate was then fractionated by careful distillation at atmospheric pressure. Fractions corresponding to the compounds represented on the diagram (under Step 3) were isolated in the yields stated. The methylnaphthalenes fraction had a boiling range of 10° and the dimethylnaphthalenes a boiling range of 20° C.

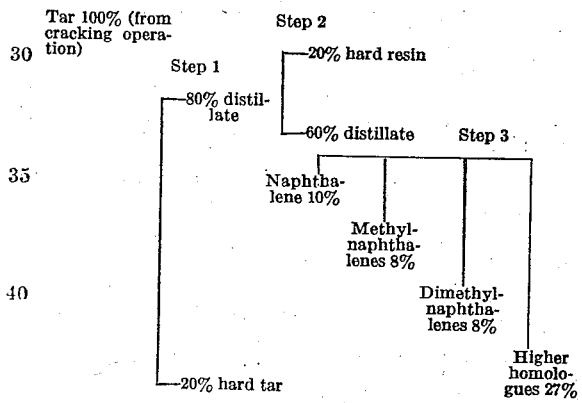

From the methylnaphthalenes fraction it is possible to fractionate out the beta isomer and, from the dimethylnaphthalenes, the 2,6 isomer is easily recoverable. "Higher homologues" designated above, contain higher-boiling aliphatic as well as homologous naphthalene compounds.

The high-boiling ends resulting from the pyrolysis at aromatic-forming temperatures of petroleum, kerosene, natural gas, and similar hydrocarbons mixtures, contain naphthalene, methylnaphthalenes, dimethylnaphthalenes, and constituents convertible to the resinous products of the invention. These high-boiling ends, besides containing naphthalene hydrocarbons, are also rich in unsaturated hydrocarbons of a non-aromatic nature. Corresponding high-boiling ends of distillates from the catalytic or pressure polymerization of olefin gases and light petroleum fractions to produce gasoline, contain similar constituents and are also suitable for treatment according to the method of the present invention.

It is apparent that the process as described provides a simple and convenient method for the recovery of materials of value, which materials hitherto were considered as waste, inasmuch as their cost of recovery in pure form was substantially in excess of their value. The process dispenses with sulfonation procedures and other procedures hitherto considered necessary for the recovery of aromatic hydrocarbons in a substantially pure state.

The present invention is particularly adapted to the treatment of liquid products and tars resulting from the cracking of petroleum. In cracking operations of this character the products are quite different from those found in coal-tar. This difference between the petroleum cracking products and products resulting from the coking of coal is attributable not only to the differences in the original materials, petroleum and coal, but also to the differences in conditions under which the particular pyrolysis operations are carried out. Coal-tar is almost exclusively aromatic in nature but the conversion of petroleum into products almost exclusively aromatic in nature has not been achieved. Thus, in cracking petroleum or petroleum hydrocarbons, whether for gasoline, aromatic hydrocarbons, or diolefins, it is necessary to control the pyrolysis carefully to prevent the ultimate conversion of the products to carbon and hydrogen. Such control includes such features as rapidly cooling the products after being subjected to pyrolysis for a limited period of time, for example, by quenching the products with steam, water, gases, fresh charge stock or molten metals. Products resulting from the pyrolysis of petroleum under such controlled conditions are the type particularly comprehended in the present invention, inasmuch as these products do not lend themselves to the conventional methods used in the coal-tar industry for the isolation of naphthalene and its homologues.

The separation of naphthalene from coal-tar distillates is a relatively simple procedure compared to the separation of the same compound from a cracked petroleum distillate. Only by converting some of the constituents to synthetic resins, by the method of the invention, has it been possible to conveniently and economically isolate naphthalene in a substantially pure state from cracked petroleum distillates.

By petroleum distillates, as used in the specification and in the claims, are to be understood natural gas, petroleum, their pyrolysis products and blends or fractions thereof. Thus, the term includes such materials as petroleum naphtha, gasoline, kerosene, refinery gases, recycling stock from previous pyrolyses and a blend of kerosene containing a small proportion of benzene.

Inasmuch as the conditions specified herein constitute preferred embodiments of the invention, it is to be understood that the invention is not limited thereto and that changes and modifications may be made to adapt the invention to other materials without departing substantially from the invention, which is defined and limited only by the claims which are appended.

What is claimed is:

1. A process of producing resinous products and recovering naphthalene hydrocarbons in substantially pure form from a naphthalene-hydrocarbon-containing tar mixture resulting from the pyrolysis of petroleum hydrocarbons at aromatic-forming temperatures, which mixture is rich in non-aromatic unsaturated hydrocarbons, and from which the naphthalene hydrocarbons are not readily separable in substantially pure form by distillation, comprising subjecting said mixture to polymerization with a Friedel-Crafts catalyst, whereby the non-aromatic unsaturated hydrocarbons are converted to a resinous body and the naphthalene hydrocarbons are thereby rendered readily separable in substantially pure form by distillation, separating the catalyst therefrom after polymerization, and thereafter recovering the resinous products and naphthalene hydrocarbons by distillation of the naphthalene-hydrocarbon components.

2. A process as defined in claim 1 and further characterized in that the naphthalene-hydrocarbon-containing tar mixture is first subjected to distillation to remove non-volatile components, after which the distillate is subjected to treatment with the catalyst.

3. A process as defined in claim 1 and further characterized in that the Friedel-Crafts catalyst is substantially anhydrous aluminum chloride.

4. In a process of recovering naphthalene hydrocarbons in substantially pure form from a naphthalene-hydrocarbon-containing tar mixture, resulting from the pyrolysis of petroleum hydrocarbons at aromatic-forming temperatures, which mixture is rich in non-aromatic unsaturated hydrocarbons and from which the naphthalene hydrocarbons are not readily separable in substantially pure form by distillation, the improvement characterized in that the hydrocarbon tar mixture is distilled to obtain a fraction boiling within the range from 180° C. at atmospheric pressure to approximately 300° C. at a pressure of from 1 to 10 mm. of mercury and this fraction is then subjected to the polymerizing action of a Friedel-Crafts catalyst whereby the non-aromatic unsaturated hydrocarbons are converted to a resinous body and the naphthalene hydrocarbons are thereby rendered readily separable in substantially pure form by distillation, and thereafter separating the naphthalene hydrocarbons from the resinous body and other components by distillation.

CHARLES A. THOMAS.
F. LOWELL TAYLOR.